United States Patent [19]
Hutchison, III

[11] 3,848,122
[45] Nov. 12, 1974

[54] ADJUSTABLE LIGHT DIFFUSER FOR AN OPTICAL PROJECTION SYSTEM

[75] Inventor: Walter A. Hutchison, III, Webster, N.Y.

[73] Assignee: Itek Corporation, Lexington, Mass.

[22] Filed: Sept. 13, 1973

[21] Appl. No.: 396,917

[52] U.S. Cl............ 240/46.51, 240/46.03, 350/266, 352/198
[51] Int. Cl. ............................................ F21v 11/14
[58] Field of Search ........ 240/46.51, 46.03; 353/55; 355/71; 352/198; 350/315, 266

[56] References Cited
UNITED STATES PATENTS

| | | | |
|---|---|---|---|
| 1,254,579 | 1/1918 | Collet | 96/41 X |
| 1,620,338 | 3/1927 | Frederick | 353/55 |
| 1,923,970 | 8/1933 | Dowling | 240/46.51 |
| 3,597,077 | 8/1971 | Dorn | 355/71 |

Primary Examiner—Richard L. Moses
Attorney, Agent, or Firm—Homer O. Blair; Robert L. Nathans; Gerald H. Glanzman

[57] ABSTRACT

An improved adjustable light diffuser for selectively attenuating light passed through a film gate for removing high intensity "hot spots." The diffuser includes a support frame having taut, thin wires suspended therefrom in a "spider web" fashion. The light attenuators consist of one or more metallic screens which are suspended from the taut wires by having the wires pass through the screen orifices, thereby to provide a highly flexible system for readily positioning the screens at desired portions of the device. Both angular and translational adjustments may be readily accomplished in a highly economical manner.

12 Claims, 2 Drawing Figures

ADJUSTABLE LIGHT DIFFUSER FOR AN OPTICAL PROJECTION SYSTEM

BACKGROUND OF THE INVENTION

The present invention relates to devices for adjusting the light intensity of light from a projection lamp passing through a film gate to provide for uniform illumination. Light attenuation devices consisting of screens are old in the art and are illustrated in U.S. Pat. Nos. 2,343,586; 1,302,802; 1,620,338 and 1,254,579. In FIG. 3 of the last-mentioned patent, a light attenuating screen comprises an open fabric-like netting, or in the alternative, a transparent plate having opaque lines produced thereon. This plate is suspended by means of elastic elongated supports such as 78 illustrated in FIG. 5 and provides for adjustment of the mesh as desired. It is desirable to provide a diffuser having a higher degree of flexibility than this device so that adjustments may be very easily made to eliminate particular illumination "hot spots" of particular projection systems.

SUMMARY OF THE INVENTION

In accordance with a preferred embodiment of the present invention, a plurality of taut, thin metallic wires are suspended from a support frame and one or more metallic screen elements are mounted upon the resulting spider web-like taut wire configuration. Mounting is preferably accomplished by having the taut suspension wires actually pass through one or more orifices of the metallic mesh screen elements.

Other objects, features and advantages of the present invention will become apparent upon perusal of the detailed description taken in conjunction with the drawings in which:

FIG. 1 illustrates the positioning of the diffuser adjacent a projection light source;

FIG. 2 discloses a preferred embodiment of the diffuser.

DETAILED DESCRIPTION

Figure 1:
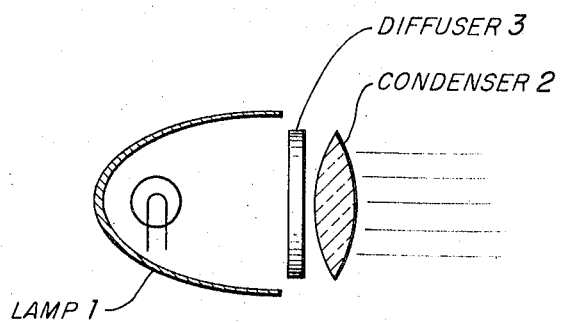

In FIG. 1, a conventional projection lamp 1 is positioned adjacent condenser lens system 2. Diffuser 3 is positioned between lamp 1 and lens system 2, to selectively attenuate illumination "hot spots" as desired.

Figure 2:
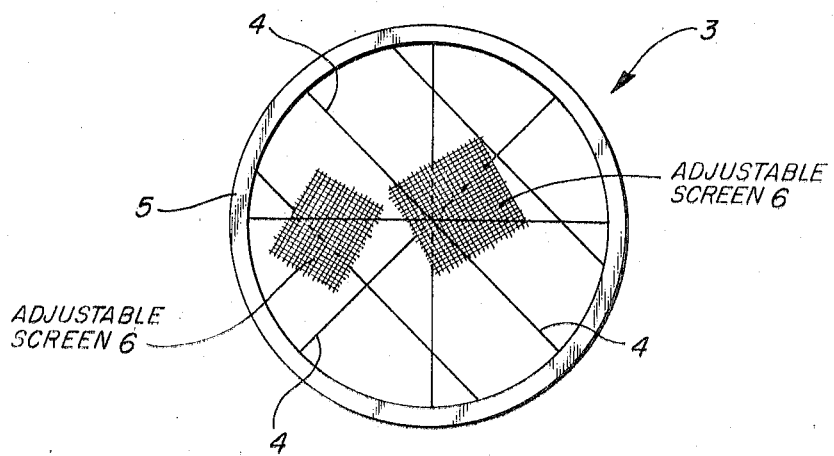

In FIG. 2, diffuser 3 includes a support frame 5 which supports a plurality of thin metallic wires 4 which are tautly suspended from frame 5. The plurality of taut wires forms a spider web-like support means for adjustable screens 6 which preferably are similar to household screens. If a sufficient plurality of wires 4 are employed, it is possible to merely slip the screens between the wires so that they are gripped by the taut wires. However, it is greatly preferred to pass the taut wires 4 through one or more holes in the metallic screen so that they are unable to slip away from the wires. Since the wires are thin they will not be imaged upon the projection screen.

It should be apparent that this arrangement provides for extreme flexibility in that the screen or screens may be readily translated and/or rotated with respect to the optical axis and the relatively clumsy arrangements of the prior art are done away with.

While a preferred embodiment of the invention has been described, the teachings of this invention will readily suggest many other embodiments to those skilled in the art. For example, while the diffuser is positioned between the illumination source and the condenser system and preferably closer to the condenser in the arrangement illustrated, it should be apparent that the diffuser may be employed in other portions of an optical projection system.

I claim:

1. An adjustable light diffuser comprising:
   a. a support frame;
   b. at least two thin elongated screen support members suspended from said support frame; and
   c. at least one adjustable screen, having orifices formed therein, for attenuating light from a source positioned on one side of said light diffuser, said screen being mounted upon said elongated support members by having said elongated support members pass through said orifices so that said screen may be readily moved about said elongated screen support members.

2. An adjustable light diffuser comprising:
   a. a support frame;
   b. at least two thin elongated screen mesh support members suspended from said support frame; and
   c. at least one adjustable metallic screen mesh, having a large plurality of orifices therein, for attenuating light from a source positioned on one side of said light diffuser, said metallic screen mesh being mounted upon said elongated support members by having said support members pass through orifices formed therein so that said metallic screen mesh may be readily moved about upon said elongated screen mesh support members.

3. An adjustable light diffuser comprising:
   a. a support frame;
   b. at least two thin screen support wires suspended from said support frame; and
   c. at least one adjustable screen for attenuating light from a source positioned on one side of said light diffuser, said screen being mounted upon said support wires so that said screen may be readily moved about upon said screen support wires.

4. The combination as set forth in claim 3 wherein said screen comprises a metallic mesh having a large plurality of orifices therein.

5. The combination as set forth in claim 3 wherein said support wires pass through orifices formed in said screen.

6. The combination as set forth in claim 4 wherein said support wires pass through orifices formed in said screen.

7. In a projection system, the combination comprising:
   a. a light diffuser including:
      1. a support frame
      2. at least two thin elongated screen support members suspended from said support frame; and
      3. at least one adjustable screen for attenuating light, said screen being mounted upon said elongated support members so that said screen may be readily moved about upon said elongated screen support members;
   b. a projection lamp positioned on one side of said light diffuser and a condenser lens system positioned on the other side of said light diffuser to provide for selective attenuation of overly intense portions of the beam produced by said projection lamp.

8. The combination as set forth in claim 7 wherein said screen comprises a metallic mesh having a large plurality of orifices therein.

9. The combination as set forth in claim 7 wherein said elongated support members pass through orifices formed in said screen.

10. The combination as set forth in claim 8 wherein said elongated support members pass through orifices formed in said screen.

11. The combination as set forth in claim 9 wherein said elongated support members comprise taut wires.

12. The combination as set forth in claim 10 wherein said elongated support members comprise taut wires.

* * * * *